Dec. 6, 1960 J. L. ARBOGAST ET AL 2,963,642
METHOD AND APPARATUS FOR DETERMINING DIRECTIONAL
DIELECTRIC ANISOTROPY IN SOLIDS
Filed Aug. 1, 1958 2 Sheets-Sheet 1

INVENTORS:
J. L. ARBOGAST
C. H. FAY
S. KAUFMAN
BY J. H. McCarthy
THEIR AGENT

INVENTORS:
J. L. ARBOGAST
C. H. FAY
S. KAUFMAN
BY: J. H. McCarthy
THEIR AGENT

United States Patent Office 2,963,642
Patented Dec. 6, 1960

2,963,642

METHOD AND APPARATUS FOR DETERMINING DIRECTIONAL DIELECTRIC ANISOTROPY IN SOLIDS

James L. Arbogast, Bellaire, and Charles H. Fay and Sidney Kaufman, Houston, Tex., assignors to Shell Oil Company, a corporation of Delaware Filed Aug. 1, 1958, Ser. No. 753,177

14 Claims. (Cl. 324—13)

This invention relates to a method and apparatus for determining a directional dielectric anisotropy in non-conductive solid substances and pertains more particularly to determining the predominate direction of orientation of the elongated grains or of the orientation of the pore spaces contained in an earth formation.

It has been found that certain non-conductive solid materials have established axes along which the dielectric property of the material differs, which difference may be termed an anomaly of the dielectric material. The reasons for some non-conductive materials possessing a dielectric anisotropy is not always clearly understood and the types of materials may range from a uniform material having a series of voids or particles lying predominately in one portion of the material, a uniform material containing a number of elongated voids or particles uniformly distributed throughout and lying in a predominate direction, or a non-uniform material made up of a plurality of elongated particles and/or having a porous structure which is more porous in one direction than the other.

In various heterogeneous solids that have a generally uniform composition, the dielectric anisotropies are small in magnitude but are significant in respect to the other properties of the materials. For example, in the art of geological exploration, certain earth formations are studied which consist of a cohesive mass of microscopic grains. Earth formations of this type exhibit small but significant dielectric anisotropies which correspond in direction to the direction along which there is a predominate common alignment among the elongated grains. Such a grain orientation is significant in respect to the manner in which the earth formation was formed and is useful in connection with geological exploration.

In the case of porous, but otherwise substantially homogeneous solid materials, such as a porous limestone or a porous resin, a similar dielectric anisotropy has been found to correspond in direction to the direction along which there is predominate alignment among the elongated pore space. Such a pore orientation is significant in respect to the porosity and other properties of fluid reservoirs rock formations, to the insulating and structural properties of porous resins, and to analogous properties of other porous materials.

In the case of a heterogeneous substance consisting of one solid material in which minute particles of a second material has been dispersed, e.g., a filled resin, a similar dielectric anisotropy has been found to correspond in direction to a non-uniform arrangement of the particles of the dispersed material. The uniformity of the mixing of the particles composing such substances is significant in respect to the control of mixing and compounding processes as well as to the thermal and other like properties of the substances.

Additionally, in certain solids consisting of uniform aggregations of crystals, a predominant common alignment of the crystallographic axes produces a corresponding dielectric anisotropy within the solid as a whole. For example, in a marble which formed in an environment in which it was continuously stressed in one direction, a dielectric anisotropy corresponds to the direction along which there is a predominant common alignment of the $c$ axes of the individual crystals of calcium carbonate.

Particularly in the case of the non-uniform arrangement of inhomogeneties resulting from a common orientation of the elongated grains in a granular formation, the detection and measurement of the phenomena heretofore necessitated long and tedious microscopic examinations. In addition, in the case of the sand grain orientations, although it has long been suspected that useful geological information could be obtained from such determinations, the information based on microscopic examinations seldom proved to be useful, because the examinations could feasibly be based on only such a small fraction of the total number of grains that are contained in a sand formation.

A primary object of the present invention is to provide a method and apparatus for quickly testing a generally uniform nonconductive solid material to detect the presence of a dielectric anomaly due to a non-uniform arrangement of relatively small inhomogeneities or anisotropies within the material and to measure the direction along which such an anomaly is most pronounced.

A further object of the present invention is to provide a method and apparatus for making macroscopic measurements on a substantially consolidated mass of non-conductive solid material to determine the microscopic orientation of the particles making up the mass.

Another object of this invention is to provide a method and apparatus for quickly determining sand grain orientation by measuring a directional dielectric property which is influenced by the orientation of all of the elongated grains that are contained in the sample.

We have observed that, when a sample of a granular earth formation, a porous earth formation or a non-conductive solid material having therein a non-uniform distribution of homogeneties that affect the dielectric constant of a material is surrounded by a body of fluid (preferably a liquid), the fluid surrounded sample exhibits dielectric constants which vary with the orientation of the sample. The surrounding fluid should preferably have a dielectric constant approximating the average dielectric constant of the sample when the dielectric anomaly being determined is small. But in samples having a high dielectric anomaly, the surrounding fluid may have a dielectric constant that varies considerably from that of the sample, say, about twice that of air. In the case of a granular earth formation, the dielectric constants reach a maximum when the dielectric constant is measured along a line parallel to the predominate direction of the orientation of the elongated grains contained in the sample. The determinations of sand grain orientation obtained in accordance with the process of this invention are in close agreement with the determinations obtained by microscopic examination. In the case of a porous non-granular earth formation sample, the dielectric constant reaches a maximum or minimum when the dielectric constant is measured along the line parallel to the predominant direction of alignment of the pores within the sample depending upon the dielectric constant of the material present in the pores.

It has been found that the measurement of grain orientation by microscopic examination is very long and tedious, and since the measurement is based on only a few hundred grains in a sample plug or core of an earth formation containing millions of grains, the results are subject to some statistical error. It is therefore another object of this invention to provide a method and apparatus for quickly measuring a directional physical property associated with grains of sand, wherein a measurement of this property, as exhibited by a sample plug, is based on all the million plus grains obtained therein, and has therefore a good statistical accuracy.

It is a further object of this invention to provide a method and apparatus for measuring the direction of maximum dielectric constant in sandstone and limestone sample plugs.

Another object of this invention is to provide a method and apparatus for detecting the direction along which there is an anomaly in a dielectric material, i.e. the direction of a dielectric anisotropy in a non-conductive solid material.

Still another object of this invention is to provide a method and apparatus adapted to measure dielectric anisotropies involving very small deviations from the average dielectric constant of a material; for example, deviations of dielectric constant of the order of 0.01 from an average dielectric constant in the order of 5.

A further object of this invention is to provide a method and apparatus for detecting the axes along which the greatest measurable difference exists in a dielectric material, said difference being termed an anomaly of the dielectric material.

Still another object of this invention is to provide a method and apparatus for determining at least one axis of the dielectric anisotropy in a substantially non-conductive solid material, which may be a measurement of the density of the material, a measurement of its porous or crystalline alignment, or a measure of the non-uniform distribution of inhomogeneties in the material.

These and other objects of this invention will be understood from the following description taken with reference to the drawing, wherein.

In the present method for determining grain orientation in cores, a sample plug or core to be measured is inserted as a rotatable part of the dielectric medium of a capacitance cell having preferably parallel plates, the axis of the core being substantially vertical and parallel to the plates. The sample plug is rotated in the capacitance cell either manually or mechanically. During each half revolution of the sample plug in the cell, the capacity reaches a maximum value when the direction of maximum dielectric constant becomes normal to the plates. During one revolution of the plug, the capacitance goes through two complete cycles.

Figure 1:
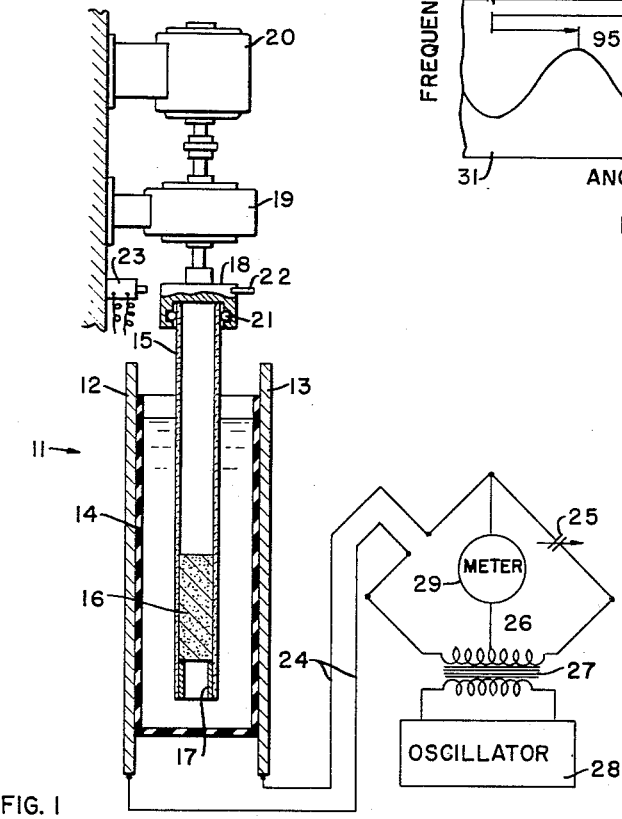
Figures 1 and 4 are diagrammatic views, partially in cross-section, of test cells for measuring the dielectric properties of a sample or core of an earth formation.

Referring to Figure 1 of the drawing, a condenser or capacitance test cell 11 is shown as comprising parallel vertical plates 12 and 13 positioned on either side of a non-conductive cell or vessel 14 which is open at the top and adapted to contain a fluid therein. Insertable into the top of cell 14 is a hollow cylindrical holder 15 in which a core or sample plug 16 may be held in any suitable manner, as by a removable sleeve 17 which may be press fitted in the open bottom of the holder 15.

The top of the cylindrical sample holder 15 is secured by means of a suitable coupling 18 to the low-speed side of a speed reducer device 19 driven by a motor 20. The coupling 18 may be provided with an internally positioned rubber ring 21 whereby the top of the sample holder 15 may be press-fitted into the coupling 18. Alternatively, cement may replace the ring 21 so that the holder 15 is cemented into the coupling 18. The coupling 18 is provided with a pin 22 adapted to contact and actuate a switch 23 at each rotation of the sample holder 15.

The capacitance cell 11 is connected through leads 24 to any suitable circuit for measuring changes in capacitance as the sample 16 is rotated in the cell. In Figure 1 the cell 11 is shown as constituting the capacitor in one arm of a bridge circuit while a variable capacitor 25 is positioned in the other arm of the circuit. The two arms of the bridge are connected to a secondary coil 26 of a transformer 27 energized from a high frequency oscillator 28. The transformer 27 forms two other arms of the measuring bridge circuit, while a meter 29 is provided for indicating changes in the capacitance of cell 11.

It is understood that various types of electric circuits may be employed to determine changes in capacitance of the cell 11. Since, in normal core samples, the dielectric changes caused by rotation of the sample in a cell are very small, a circuit of the type schematically shown in Figure 2 is preferred.

Figure 2:
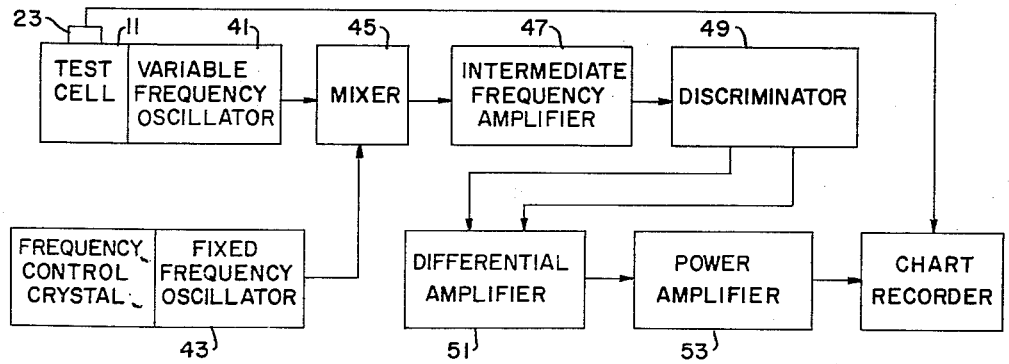
Figure 2 is a schematic block diagram of a circuit used for measuring changes in the dielectric properties of a sample.
Figure 5:
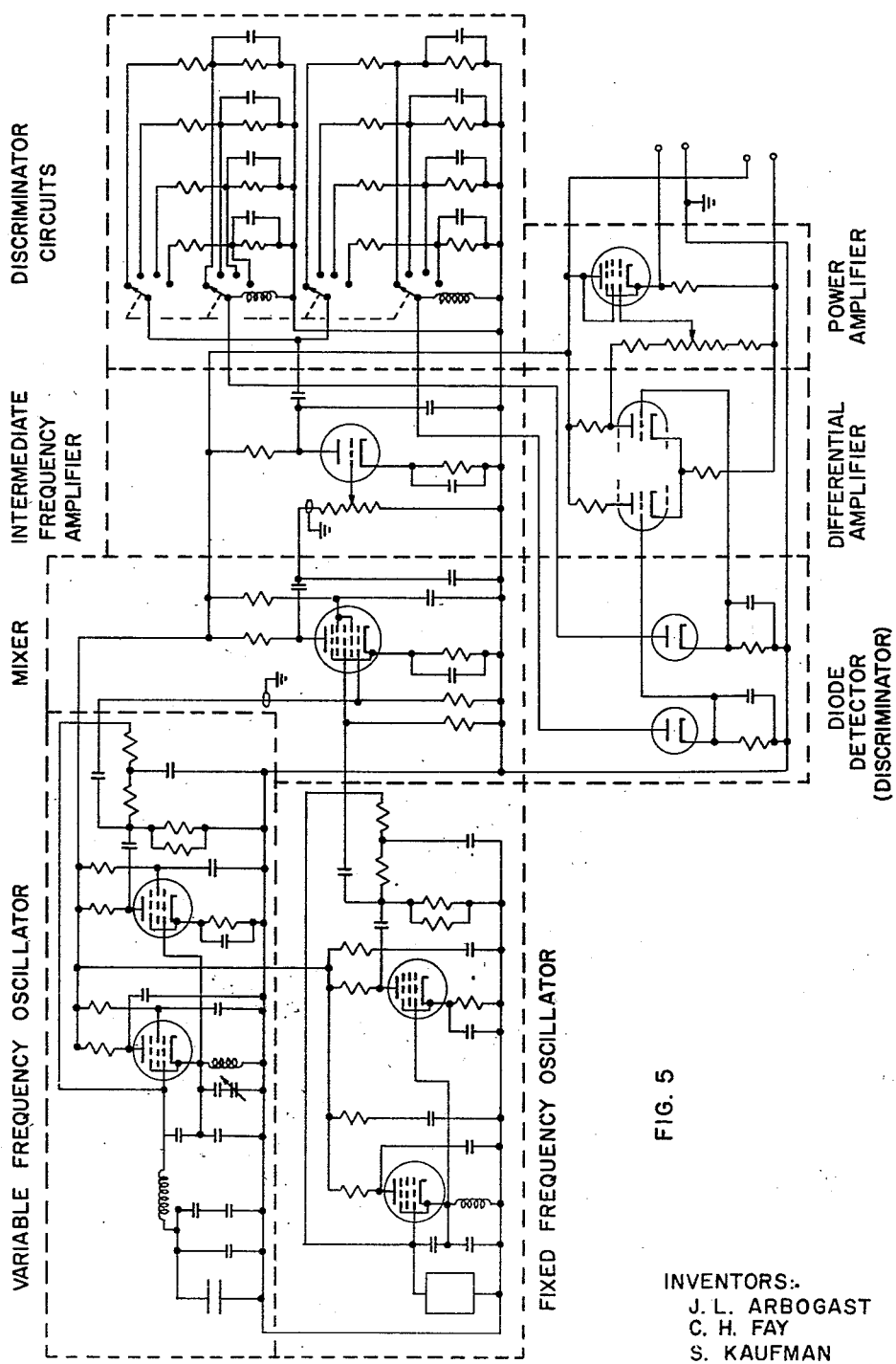
Figure 5 is a circuit diagram of the system schematically shown in Figure 2.

The system of Figure 2 differs from the one of Figure 1 in that no variable condenser 25 is used to balance out changes in the capacity of the cell 14. Instead, any change in the capacity of said test cell is converted to an electrical signal by making the capacitance cell 11 part of the resonant circuit of a variable frequency oscillator 41, the resulting oscillation being frequency-modulated as the capacity changes. This frequency-modulated signal of for example, about 800 kilocycles is heterodyned in a mixer 45 against a constant frequency crystal-controlled oscillator 43, operating on about 795 kilocycles. The resulting 5 kilocycle frequency-modulated difference frequency is amplified by an intermediate frequency amplifier 47 and is fed to a discriminator circuit 49, where the frequency modulation is detected and made to appear as the variable difference of two voltages. The two output voltages of the discriminator are fed to a differential amplifier 51 whose output is a measure of the difference of the two voltages received from the discriminator. The differential amplifier output is fed to a power amplifier 53 which drives the chart recorder 54, or one of the channels of a two-channel chart recorder. The system of Figure 2 is shown in greater detail in Figure 5.

If the dielectric anisotropy of the material to be measured is likely to be small, it is important to eliminate or minimize the side effects that may be created by irregularities in the symmetry of the sample plug, or irregularities in the path of rotation of the sample and the sample holder. Such side effects can be very materially reduced or substantially eliminated by constructing the fluid container which is located between the capacitor plates (e.g., vessel 14 in Figure 1) and the portions of the sample holding and rotating means which extend between the capacitor plates (e.g., holder 15 in Figure 1) of materials having dielectric constant substantially approximating the average dielectric constant of the sample, and filling the vessel 14 with a liquid having a similar dielectric constant. For example, in measuring the dielectric anisotropy in a sandstone sample having an average dielectric constant of about 4.7, the vessel 14 and the holder 15 can advantageously be constructed of glass having a dielectric constant of about 4.5, while the fluid in the vessel can advantageously be a mixture of chlorinated diphenols, such a mixture being available under the trade name of "Pyranol" which has a dielectric constant of about 4.5. In general, the materials used in the vessel 14 in the holder 15 can be any solid material having an appropriate dielectric constant while the fluid in the vessel 14 can be any unreactive liquid or gas having an appropriate dielectric constant. Prior to taking a measurement, a sample plug 16 is cleaned and dried, impregnated with an impregnating material if desired, and immersed in a surrounding liquid.

In taking a measurement, the impregnated and immersed sample plug is rotated within cell 14. Irregularities in the cylindrical shape of the plug, or a wobbling of the rotating plug can cause the addition or subtraction of the solids of the plug components in the path of the measuring signal. While the dielectric constant of the impregnating material and/or the surrounding liquid can vary above and, below the average dielectric constant of the sample plug, the variations should be small enough so that capacitance changes due to irregularities in the shape or the rotation of the plug are smaller than the changes due to the alignment of the elongated sand grains relative to the capacitor plates.

Using the apparatus illustrated in Figure 1, measurements of a core sample having an average dielectric constant of 4.7 were successfully made while using as both the impregnating material and the surrounding liquid, ethyl acetate, having a dielectric constant of 6.4; amyl acetate, having a dielectric constant of 5.05; and Pyranol, having a dielectric constant of 4.5. While in general it is more convenient to employ the same liquid as both the surrounding liquid and the impregnating liquid, two different liquids can be used, as long as they have suitable dielectric constants. Also, in determining the grain orientation in an earth formation which is not sufficiently consolidated to form a suitable sample plug when impregnated with a liquid, the earth formation can be impregnated with a material that solidifies to form a solid having a dielectric constant substantially equal to the dielectric constant of the earth formation, and then immersed in a suitable surrounding liquid.

Sample plugs or cores to be used in the present apparatus may be in the order of about 1 inch in diameter and one or two inches in height although it is to be understood that larger or smaller samples may be used. When a cylindrical core sample 16 is cut from a rock or a larger oriented core, an orientation mark is drawn on the outside of the core sample 16 so that the reference azimuth for the maximum dielectric constant of the impregnated sample is known.

Figure 3:
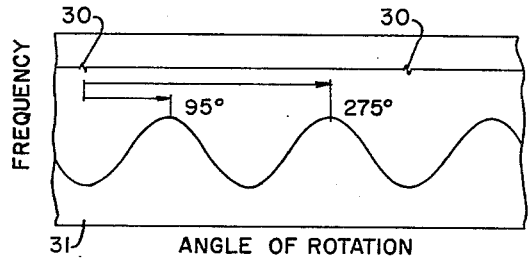
Figure 3 is a reproduction of a section of a chart illustrating the type of data recorded by the present apparatus.

In operation, the sample 16 is put in the holder 15 which is rotated slowly, for example, at the rate of about one revolution in three seconds. As the sample plug 16 rotates at constant velocity, an approximately sinusoidal variation of the capacity of the cell 11 may be produced depending on the character of the sample, resulting in a sinusoidal trace on the chart recorder as shown in Figure 3. The sinusoid is at twice the frequency at which the plug is rotated.

The chart recorder is also electrically connected to the switch 23, which is actuated by means of pin 22 upon rotation of the holder 15. This switch 23 produces a marker pulse 30 on the chart 31 (Figure 3) each time the pin 22 on the coupling 18 passes closest to one of the condenser plates 13, thus marking the beginning of a new revolution. Preferably, the orientation mark on the sample core 16 is aligned with the pin 22.

If the distance in the positive time sense from the leading edge of the marker pulse to one of the two succeeding maxima of the sinusoid is denoted by A, and the distance between two consecutive marker pulses is denoted by B, then the ratio $A/B$ is the fraction of a circle between the reference marker on the plug holder and the direction of maximum dielectric constant in the plug.

In other words, when the orientation mark on the sample plug 16 is aligned with the pin 22 which actuates the time switch 23, it may be seen that the distance between the time mark 30 on the chart 31 and the two succeeding maxima of the sinusoid represents the azimuthal deviation on the core from its orientation mark to the direction of maximum dielectric constant of the core. There are two angle values, there being two orientations of the plug sample which produce maximum capacity, and these directions being, of course, 180° apart. Thus it may be seen that by rotating the core through an angle of 180° both maximum and minimum dielectric constant readings, and their related directions can be obtained. In some cases it would be sufficient to rotate the core only about 90 degrees to obtain either a minimum or a maximum reading, it being known that the other reading would be 90 degrees apart.

In the event that the core sample 16 being tested is contaminated with foreign matter, it should be thoroughly cleaned prior to testing it. If the contaminating matter in the core sample is a petroleum product, the core sample is preferably thoroughly cleaned, for example, in a distillation extraction apparatus for a suitable period of time, say 24 hours. The residual tolusol in the sample may be baked out by putting the sample in an oven at 100° C. for about 12 hours. The sample plug 16 is then preferably evacuated to 1 millimeter mercury or less for a period of ½ hour more or less. The plug is then covered with the impregnating fluid and exposed to atmospheric pressures so that the impregnating fluid is driven into the plug.

Figure 4:
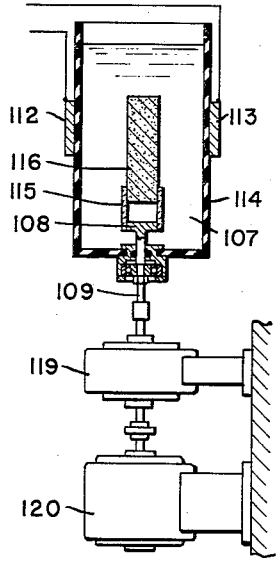

While the preferred form of the apparatus is shown in Figure 1, other types of apparatus may be used to practice the method of the present invention. The important thing is that the apparatus be arranged to measure the dielectric constant of a sample from several, and preferably all points around at least 90 degrees, and preferably 180 or 360 degrees, of the periphery of the sample. It is immaterial whether the sample turns within the cell, or the cell turns around the sample, or the cell be provided with several sets of plates arranged so as to inspect the sample from several different angles around its periphery. As shown in Figure 4, an elongated cylindrical core sample 116 is positioned within a fluid dielectric 107 contained within a vessel 114 made of nonconductive material. Plates 112 and 113 of a capacitance cell are fixedly secured to the outer surface of the vessel 114 but, if desired, they may be located inside. Positioned in the lower part of the vessel 114 is a small turntable 108 whose shaft 109 extends in a fluidtight manner through the bottom of the vessel 114 and is driven by speed reducing device 119 which in turn is rotated by motor 120.

A core sample 116, of the rock or formation to be tested, may be placed directly on the turntable 108 for rotation therewith or may be elevated above said turntable, as illustrated in Figure 4, by securing it into the top of a quartz tube 115, or other means, which is in secured to the turntable 108. Alternatively, the table 108 may be raised by extending the shaft 109 so that it is closer to the plates 112 and 113, or the plates 112 and 113 may be lowered so that they are closer to the table 108. More accurate results may be obtained if an elongated core sample 116 is employed having a length sufficient so that the top and bottom of the sample 116 extend above and below the field of the capacitance plates 112 and 113. With elongated samples of this type positioned between the narrower plates the ends of the sample 116 do not have to be prepared as accurately. In order to obtain accurate capacitance readings, the test portion of the sample 116 between the capacitor plates should be substantially circular in cross section.

In the case of porous granular materials such as sandstones, we have discovered that the step of impregnating the porous materials with a polar liquid having a dielectric constant approximating but not equal to that of the solid, has the effect of materially enhancing the magnitude of the dielectric anisotropy corresponding to the direction of common alignment among the elongated grains.

For example, in the case of sandstone composed primarily of granular crystals of quartz, such a fluid impregnation caused the magnitude of the dielectric anisotropy corresponding to the direction of the predominant common alignment of the grains to be materially greater than the difference between the dielectric constants corresponding to the $c$-axis and $a$-axis of a quartz crystal. In a quartz crystal, the dielectric constant perpendicular to the $c$-axis (i.e., corresponding to an $a$-axis) exceeds the average dielectric constant parallel to the $c$-axis by about 0.07 unit. In measurements using a cell of the type shown in Figure 1, calibrated so that a dielectric anisotropy corresponding to the difference between the $a$-axis and the $c$-axis in a quartz crystal would amount to a deviation of about 4 units, the average of several sandstone plugs which were impregnated with Pyranol exhibited a deviation in the order of 8 units. In addition, in similar measurements of sandstone samples, directional dielectric anisotropies which corresponded to microscopically measured directions of grain orientations have been obtained when using as both the impregnating and surrounding fluids ethyl acetate having a dielectric constant of 6.4 amyl acetate having a dielectric constant of 5.05, and Pyranol having a dielectric constant of 4.5.

Where desired, the impregnating fluid can have a different composition from that of the surrounding fluid, and in some cases the impregnating fluid can be liquefiable material that solidifies within the interstices between the grains of a granular material or within the pores of a porous material. Because of this, the present invention is adapted for determining the direction of common orientation among elongated particles in an unconsolidated mass of particles; for example, in an unconsolidated mass of sand grains. In such an operation, a polymerizable fluid can be caused to flow into a selected mass of the grains either in a formation within a well or a core cut therefrom, polymerized into a solid in situ and sample plugs suitable for measurement in the above instrument can then be cut from the resulting solid material.

*Example 1*

The importance of conducting grain orientation measurements that are representative of the direction of common alignment among a statistically significant number of grains was tested by comparing microscopic measurements with the dielectric constant measurements obtained by the instrument described in Figure 1. Test plugs were cut from a core of a subsurface sand and the directions of the common orientation of their grains were measured by the dielectric constant measuring procedure. Thin sections were then cut from each of the test plugs and subjected to visual measurements.

In each case, the dielectric constant measurements involve the orientation of about ten million grains, whereas the visual measurements involve the number of grains indicated. The directions of common alignment obtained by the measurement are reported in terms of 0 to 180 degrees relative to a reference mark turned to a position corresponding to zero degrees.

UPPER LEVEL TEST PORTION

| Plug | Number of grains | Visual,[1] direction (degrees) | Dielectric constant,[2] direction (degrees) |
| --- | --- | --- | --- |
| 1 | 481 | 26 | 96 |
| 2 | 534 | 77 | 108 |
| 3 | 498 | 93 | 90 |
| 4 | 503 | 85 | 118 |
| 5 | 511 | 29 | 93 |
| 6 | 514 | 169 | 89 |
| 7 | 535 | 21 | 92 |

[1] Weighted Average for 3,576 grains—66°.
[2] Average for 35,000,000 grains—98°.

LOWER LEVEL TEST PORTION

| Plug | Number of grains | Visual,[1] direction (degrees) | Dielectric constant,[2] direction (degrees) |
| --- | --- | --- | --- |
| 1 | 496 | 94 | 92 |
| 2 | 470 | 58 | 81 |
| 3 | 535 | 96 | 85 |
| 4 | 475 | 91 | 91 |
| 5 | 480 | 62 | 84 |
| 6 | 497 | 91 | 84 |

[1] Weighted Average for 2,953 grains—84°.
[2] Average for 30,000,000 grains—86°.

NOTE.—Weighted average visual measurement based on 6,529 grains =81°. Average dielectric measurement based on 75,000,000 grains=92°.

It is apparent that the individual visual measurements varied to an extent making many measurements a necessity. The performance of the visual measurements based on 6,529 grains required about twenty man-days. In the dielectric anisotropy measurements, cylindrical sample plugs were impregnated with and immersed in Pyranol and tested in a cell of the type shown in Figure 1, using a glass vessel 14 and a glass holder 15.

*Example 2*

In order to measure dielectric anisotropy corresponding to different types of non-uniform distributions, a number of different types of cylindrical test plugs were tested in the above manner using the fluids indicated.

To measure the orientation of void spaces in an otherwise substantially homogeneous solid, oriented artificially voids were drilled in sample plugs of lucite, and the sample plugs were tested using Pyranol as the surrounding fluid. One plug containing several holes drilled through it in the same direction gave a strong positive orientation in that direction. Another plug which contained one hole drilled only part way through the plug still produced a measurable orientation in the direction of the hole. In another plug, two holes were drilled through the plug in different directions and the orientation determined by the present apparatus was a vector sum of the two directions.

In addition to the above test which demonstrated the ability of the apparatus to measure the orientation of void spaces, various carbonate rock materials were tested. In the apparatus used, the composition and shape of the holder 15 was such that in the measuring cell, the effective dielectric constant of the holder was about 4.5, and the holder used exhibited a small but significant direction variation in dielectric constant that corresponded with a removable portion of the glass tube. In the case of the measurements designated as "unsatisfactory" hereinbelow, the direction of maximum variation in dielectric constant corresponded to the directional variation in the holder rather than to any such property in the sample. The figures in parentheses are the approximate dielectric constants of the various materials employed.

USING A GLASS SAMPLE HOLDER HAVING A DIELECTRIC CONSTANT OF 4.5

| Plug | Impregnating fluid | Surrounding fluid | Measurement of dielectric anisotropy |
|---|---|---|---|
| 1. Porous limestone (8.3) | Air (1) | Pyranol (4.5) | Satisfactory. |
| 2. Porous limestone (8.3) | Pyranol (4.5) | do | Do. |
| 3. Porous limestone (8.3) | Water (80) | do | Do. |
| 4. Porous limestone (8.3) | Methyl salicylate (9) | Methyl salicylate (9) | Unsatisfactory. |
| 5. Porous limestone (8.3) | do | Methyl salicylate-xylene mixture (4.6). | Satisfactory. |
| 6. Calcite crystal (8.5 max., 8.0 min.). | None | Pyranol (4.5) | Satisfactory (corresponding to c-axis of crystal). |

USING A GLASS SAMPLE HOLDER HAVING A DIELECTRIC CONSTANT OF 7.5

| Plug | Impregnating fluid | Surrounding fluid | Measurement of dielectric anisotropy |
|---|---|---|---|
| 7. Porous limestone | Pyranol (4.5) | Pyranol (4.5) | Unsatisfactory. |
| 8. Porous limestone | Methyl salicylate-xylene mixture (7.5). | Methyl salicylate-xylene mixture (7.5). | Satisfactory. |
| 9. Porous limestone | Air (1) | do | Do. |
| 10. Porous limestone | Water (80) | do | Do. |

This application is a continuation-in-part application of U.S. patent application Serial No. 572,646, filed March 20, 1956, and now abandoned.

We claim as our invention:

1. Apparatus for determining at least one axis of the dielectric anisotropy in a substantially non-conductive solid material, said apparatus comprising a vessel adapted to contain a liquid dielectric, a capacitance cell having spaced plates mounted adjacent said vessel so that at least a portion of the liquid dielectric therein is between said plates, a sample holder mounted within said vessel adapted to position at least a portion of a sample in the fluid dielectric between said plates, said simple holder and said capacitance cell being movably mounted about an axis relative to each other, and means for measuring and indicating changes in capacitance of said capacitance cell as the position of a sample held by said sample holder moves through an arc of at least 90 degrees relative to said capacitance cell.

2. Apparatus for determining at least one axis of the dielectric anisotropy in a substantially non-conductive solid material, said apparatus comprising a capacitance cell having spaced plates, a vessel positioned between the plates of said cell, said vessel adapted to contain a liquid dielectric, a sample holder mounted adjacent said vessel for positioning a sample therein, said sample holder and said capacitance cell being movably mounted about an axis relative to each other, and means for measuring and indicating changes in capacitance of said capacitance cell as the position of a sample held by said sample holder moves through an arc of at least 90 degrees relative to said capacitance cell.

3. Apparatus for determining at least one axis of the dielectric anisotropy in a substantially non-conductive solid material, said apparatus comprising a capacitance cell having spaced plates, a vessel positioned between the plates of said cell, said vessel adapted to contain a liquid dielectric, a sample holder mounted within said vessel, means for moving said sample holder and said capacitance cell relative to each other about a common axis, and means for measuring and indicating changes in capacitance of said capacitance cell as the position of a sample held by said sample holder moves through an arc of at least 90 degrees relative to said capacitance cell.

4. Apparatus for determining the two axes of dielectric anisotropy in a substantially non-conductive solid material, said apparatus comprising a capacitance cell having spaced plates, a vessel positioned between the plates of said cell, said vessel adapted to contain a liquid dielectric, a sample holder mounted adjacent said vessel, said sample holder and said capacitance cell being movably mounted about an axis relative to each other and means for measuring and indicating changes in capacitance of said capacitance cell as the position of a sample held by said sample holder moves through an arc of at least 180 degrees relative to said capacitance cell.

5. An apparatus for determining the average orientation of grains of sand in a rock core sample, said apparatus comprising a capacitance cell having spaced plates, a vessel positioned between the plates of said cell, said vessel being adapted to contain a fluid dielectric having a dielectric constant substantially equal to that of the core sample being tested, a sample holder for rotatably supporting said core sample in said fluid dielectric, means for rotating said sample holder in said vessel, and means for measuring and indicating changes in capacitance of said capacitance cell as said core sample is rotated therein.

6. An apparatus for determining the average orientation of grains of sand in a rock core sample, said apparatus comprising a capacitance cell having spaced plates, a vessel of non-conductive material positioned between the plates of said cell, said vessel being adapted to contain a fluid dielectric having a dielectric constant substantially equal to that of the core sample being tested, a tubular sample holder for containing and rotatably supporting said core sample in said fluid dielectric, said sample holder being made of a material having a dielectric constant substantially equal to that of the core sample, motor means for rotating said sample holder in said vessel, and means for measuring and indicating changes in capacitance of said capacitance cell as said core sample is rotated therein.

7. An apparatus for determining the average orientation of grains of sand in a rock core sample, said apparatus comprising a capacitance cell having spaced plates, a vessel of non-conductive material positioned between the plates of said cell, said vessel being adapted to contain a fluid dielectric having a dielectric constant substantially equal to that of the core sample being tested, a rotatable turntable positioned in the lower portion of said bath for rotatably supporting said core sample in said fluid dielectric, means for rotating said sample holder in said vessel, and circuit means for measuring and indicating changes in capacitance of said capacitance cell as said core sample is rotated therein.

8. A process for treating a sample of an earth formation to enhance any directional dielectric properties imparted to said sample by an orientation of grains elongated in a common direction, which process comprises removing liquids and gases which are present in the pores of the sample, impregnating the so-treated sample with a material having a dielectric constant about equal to the average dielectric constant of the formation, and surrounding the impregnated sample with a liquid having a dielectric constant about equal to the dielectric constant of the formation to provide a sample prepared for measurement of the dielectric properties of the sample.

9. A method of determining at least one axis of the dielectric anisotropy in a substantially non-conductive solid material which comprises obtaining a sample of the material to be tested, said sample having a test portion thereof that is substantially circular in cross section, immersing the sample in a volume of a fluid having a dielectric constant at least twice that of air, positioning said test portion of said sample and at least a portion of the fluid surrounding it between the plates of capacitance measuring means, and measuring the dielectric constant of the sample as a function of position through an angle of at least 90 degrees around the periphery of said sample.

10. A method of determining at least one axis of the dielectric anisotropy in a substantially non-conductive solid material which comprises obtaining a sample of the material to be tested, forming a test portion on said sample that is substantially circular in cross section, immersing the sample in a volume of a fluid having a dielectric constant at least twice that of air, positioning said test portion of said sample and at least a portion of the fluid surrounding it between the plates of capacitance measuring means, and measuring the dielectric constant of the sample as a function of position through an angle of at least 90 degrees around the periphery of said sample.

11. A method of determining at least one axis of the dielectric anisotropy in a substantially non-conductive solid material which comprises obtaining a sample of the material to be tested, said sample having a test portion thereof that is substantially circular in cross section, immersing the sample in a volume of a fluid having a dielectric constant at least twice that of air, positioning said volume of fluid and said test portion of said sample between the plates of a capacitor cell in a manner such that the axis of said test portion is substantially perpendicular to the electrostatic field of said capacitor cell, rotating the position of said sample and said cell relative to each other at least 90 degrees substantially about the axis of the test portion of said sample, and measuring capacitance changes of said cell corresponding to angular displacements between said sample and said cell.

12. A method of determining the two axes of dielectric anisotropy in a substantially non-conductive solid material wihch comprises obtaining a sample of the material to be tested, said sample having a test portion thereof that is substantially circular in cross section, immersing the sample in a volume of a fluid having a dielectric constant at least twice that of air, positioning said volume of fluid and said test portion of said sample between the plates of a capacitor cell in a manner such that the axis of said test portion is substantially perpendicular to the electrostatic field of said capacitor cell, rotating the position of said sample and said cell relative to each other at least 180 degrees substantially about the axis of the test portion of said sample, and measuring capacitance changes of said cell corresponding to angular displacement between said sample and said cell.

13. A method of determining the average orientation of grains of sand in a core which comprises cutting a cylindrical sample of the core to be tested, immersing the sample in a bath of a fluid having a dielectric constant substantially equal to that of the sample, positioning said bath and sample between the plates of a capacitor, rotating said sample substantially about the axis thereof within said bath, and measuring capacitance changes of said cell corresponding to angular displacements of said sample.

14. A method of determining the average orientation of grains of sand in a core which comprises cutting a cylindrical sample of the core to be tested, cleaning the sample plug, evacuating said sample plug, impregnating said sample plug with a fluid having a dielectric constant substantially equal to that of the sample plug, immersing the impregnated sample plug in a bath of the fluid dielectric positioned between the plates of a capacitance cell, rotating said sample plug on its axis within said bath, and measuring changes in capacitance with varying degrees of rotation of said plug sample.

References Cited in the file of this patent
UNITED STATES PATENTS

| | | |
|---|---|---|
| 2,616,068 | McDonald | Oct. 28, 1952 |
| 2,634,317 | Marchand et al. | Apr. 7, 1953 |
| 2,665,332 | Weiss | Jan. 5, 1954 |